United States Patent Office 3,466,545
Patented Sept. 9, 1969

3,466,545
APPARATUS AND METHOD TO MINIMIZE AND DEFINE THE EFFECT OF A TRANSMISSION MEASURING APPARATUS ENVIRONMENT IN MEASURING TRANSISTOR PARAMETERS
James G. Evans, Englishtown, N.J., and Dwight W. Grant, Clark, Ind., assignors to Bell Telephone Laboratories, Incorporated, Murray Hill, N.J., a corporation of New York
Filed Aug. 14, 1967, Ser. No. 660,463
Int. Cl. G01r 27/02
U.S. Cl. 324—158
13 Claims

ABSTRACT OF THE DISCLOSURE

A transmission measuring apparatus measures the transmission parameters of a transistor by sequentially connecting the transistor in a plurality of test path configurations via the sequential switching of a plurality of transmission path components. Attenuating pads are selectively inserted in each test configuration advantageously to isolate the transistor from disturbances in the test paths without adversely affecting the resolution of the measured parameters. By taking additional transmission measurements with calibration networks, the environmental effect of the transmission measuring apparatus on the measured transmission parameters is defined. A constant impedance bias signal network permits the use of a broad frequency range of test signals without significantly attenuating the test signals or adversely affecting the resolution of the various test measurements.

Field of the invention

Figure 1:
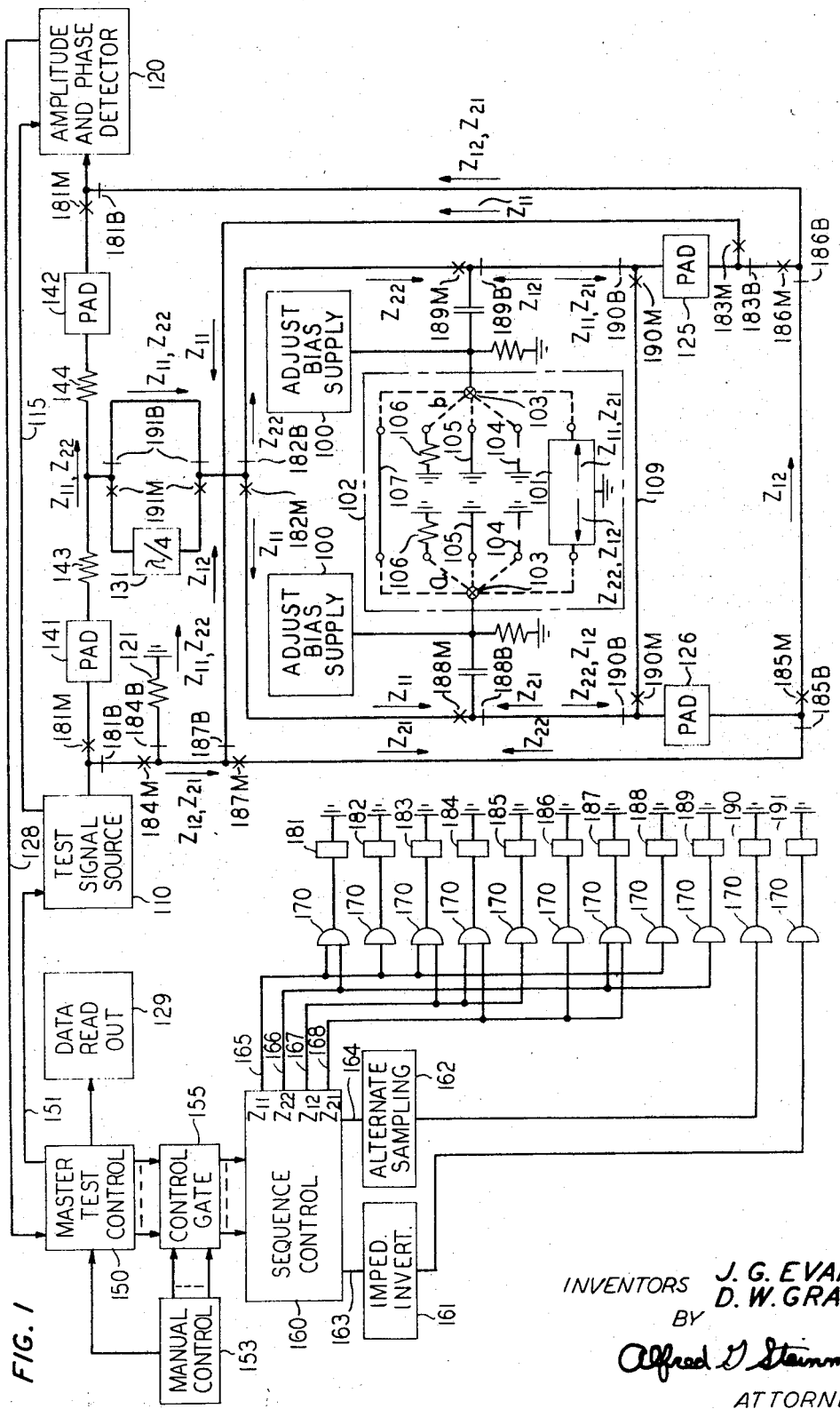

This invention relates to a transmission measuring apparatus to measure in successive operations a complete array of transmission parameters of a transistor at a plurality of high frequencies while precisely defining and controlling the effects of variations in the measured transmission parameters due to impedance discontinuities and frequency responsive variations in the characteristic impedances of the transmission measuring apparatus.

Background of the invention

The linear operation of a transistor may be completely specified by a matrix of four scattering parameters which are defined by two direct insertion transmission measurements and two shunt insertion transmission measurements. The transmission measurements comprise complex values denoting an insertion gain and a phase angle and are mathematically transformed into the scattering parameters.

The scattering parameters are a measure of the reflection coefficients of a network and are particularly useful where a network is terminated in some finite impedance. Scattering parameters are defined with respect to the terminating impedance of the network. A complete description of scattering parameters may be found in "Network Theory: An Introduction to Reciprocal and Nonreciprocal Circuits," Carlin, H. J., and Giordano, A. B., Prentice-Hall, Englewood Cliffs, N.J., 1964.

To determine the scattering matrix of a transistor accurately, its input and output terminals must be accurately terminated in some well-defined impedance. If the scattering matrix of the transistor is to be accurately determined over a broad frequency range of high frequency test signals, its input and output termination impedances must either remain essentially invariant for that range of frequencies or be a precisely known quantity. Termination impedances of the transmission measuring apparatus, however, tend to vary significantly over a wide frequency range of test signals. This variation is due to circuit discontinuities causing signal reflections throughout the test paths of the transmission measuring apparatus. Additionally, the bias supply networks used to apply bias signals to the transistor are frequency responsive and therefore introduce frequency responsive impedance discontinuities into the transmission measuring apparatus test path. These frequency responsive variations in the impedance value of the transistor terminations cause the values of the derived scattering matrix to substantially deviate from the desired scattering matrix referenced to an idealized terminating impedance. It is therefore desirable to devise a transmission measuring apparatus which permits the precise definition and minimization of the effect of the termination and test path impedance variations on the measured transmission parameters.

A particular transmission measuring apparatus designed to minimize the environmental effect of the measuring apparatus on the transmission measurements of transistors is disclosed by D. Leed and O. Kummer in the Bell System Technical Journal, vol. 40, May 1961, pages 841–884. The transmission measuring apparatus disclosed therein reduces the effect of impedance variations and circuit discontinuities on the transmission measurements by careful design refinements. These design refinements include the synthesis of termination impedances to match the characteristic impedance level of the test path to minimize test signal reflections. Circuit discontinuities are minimized by the utilization of specially designed high loss coaxial bias pads inserted in the test path which mask the circuit discontinuities. The amount of loss permissible is limited by the bias current requirements of the transistor and the ease of bias current adjustment. The bias pads additionally cause a significant attenuation of the test signal and hence significantly reduce the precision of the shunt insertion transmission measurements as compared with the direct insertion transmission measurements. This loss of measurement precision occurs in the shunt insertion transmission measurement because the test signal and its reflection must both traverse the same coaxial bias pad thereby causing double attenuation of the measured signal. Hence the resolution of the different types of transmission measurements is not uniform. Additionally, the design refinements do not completely eliminate the frequency responsive environmental effect of the transmission measuring apparatus on the measured transmission parameters and hence the derived scattering matrix is referenced to many unknown impedances.

It is therefore an object of the invention to precisely define and minimize the effects of the transmission measuring apparatus environment in transmission measurements to determine the scattering matrix of a transistor.

It is another object of the invention to utilize a bias circuit which does not attenuate test signals and hence does not change the relative precision of the direct insertion and shunt insertion transmission measurements.

It is yet another object of the invention to minimize the change in environment due to different test configurations in conducting a plurality of transmission measurements to determine the scattering matrix of a transistor.

Summary of the invention

Therefore in accordance with the present invention, a transmission measuring apparatus is utilized to determine the scattering matrix of a transistor by measuring its direct insertion and shunt insertion transmission parameters over a specified frequency range. Test signals generated at a preselected plurality of frequencies from 50 kHz. to 250 mHz. are applied to a transistor inserted in a mounting network which includes bias circuitry to couple a constant bias supply to the transistor without distorting or appreciably attenuating the test signal. The mounting network is connected to the transmission measuring apparatus, via blocking capacitors, to isolate the bias signals therefrom. Switching circuitry external to the mounting network sequentially connects the transistor to the test signal source and a signal amplitude and phase detector in four different specific test configurations utilizing substantially the same test path components to measure the various transmission parameters of the transistor. Selected ones of a plurality of signal attenuation pads are included in each test path, adjacent to the mounting network, to prevent substantially changing the termination impedances of the transistor in the various test path configurations. By thus isolating the immediate environment of the transistors being tested from the transmission measuring apparatus, as described above, the effect of the measuring apparatus on the measured transistor parameters is minimized.

An important feature of the invention is a provision to measure the actual deviations of the termination impedances by specified shunt insertion calibration measurements permitting the subsequent transformation of the derived scattering matrix of the transistor into a normalized scattering matrix defined by an idealized termination impedance. These calibration measurements are performed by interconnecting the mounting terminals connected to the test path by a coaxial strap connector, having a well-defined signal transmission length and characteristic impedance.

Another feature of the invention is a bias signal application network which couples the bias supply to the transistor. The bias signal application network comprises a bias signal path which presents a substantially constant high shunt impedance to the test signals for their entire frequency range while at the same time presenting a minuscule impedance to the bias signals applied to the transistor. The low impedance presented to the bias signals advantageously permits the direct simultaneous adjustment of combined voltage and current bias signals to the different transistor terminals without time consuming approximation adjustments to counter the active current amplification effect of the transistor. The high shunt impedance prevents significant attenuation of the test signal over the entire test frequency range. The shunt connection and the high test signal impedance of the bias signal application network permits all the test measurements to be made with equal resolution.

Yet another feature of the invention is the advantageous selective switching of attenuation pads into the terminal portion only of the test path for the shunt insertion transmission measurements to minimize test signal reflections due to the measuring apparatus without attenuating test signal reflections due to the transistor.

The attenuation pads additionally are advantageously switched into the test path at both of the mounting terminal connections for direct insertion transmission measurements to provide substantially the same terminating impedance environments as in the shunt insertion transmission measurements.

Drawings

Figure 2:
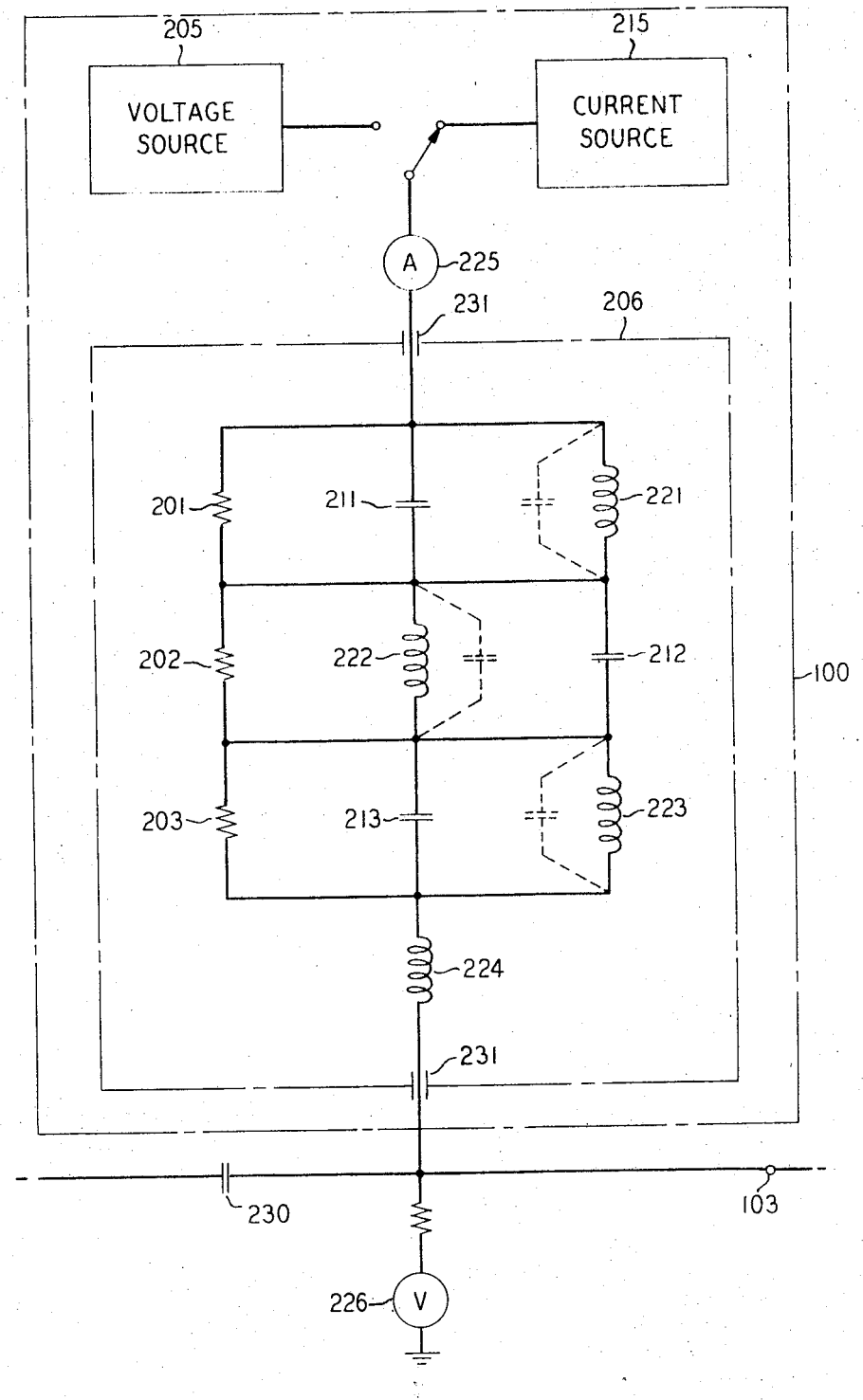

Various additional objects, features and advantages will be readily apparent in the following detailed description and accompanying drawings of an illustrative embodiment of the invention wherein:

FIG. 1 shows a schematic diagram of one illustrative embodiment of a transmission measuring apparatus arranged according to the invention to perform the direct and shunt insertion transmission measurements on a transistor; and FIG. 2 shows in detail a bias signal application network arranged according to the invention to connect the bias supply to the transistor mounting terminals of the transmission measuring apparatus to bias the transistor for test purposes.

Detailed description

In the testing procedure to determine the four scattering parameters comprising the scattering matrix of a transistor, a plurality of transmission and calibration measurements are made, each of which comprises an insertion gain and a phase angle measurement. Each separate transmission measurement requires a separate test path configuration interposing the transistor between a test signal source and an amplitude and phase detector. The calibration measurements use the same test path configurations. The transmission measurements, as described below, include a forward and reverse direct insertion transmission measurement and a forward and reverse shunt insertion transmission measurement. These measurements combined with the calibration measurements may be respectively converted into the impedance and transfer scattering parameters $S_{aa}$, $S_{bb}$ and $S_{ab}$, $S_{ba}$, respectively, comprising the scattering matrix of the transistor.

Certain additional calibration measurements described hereinbelow, are made which permit the normalization of the scattering matrix to some idealized reference termination impedance. A discussion of one method of transforming the aforesaid transmission and calibration measurements into a scattering matrix referenced to the actual impedance of the transmission measuring apparatus may be found in "Microwave Measurements" by E. L. Ginzton, McGraw-Hill, New York, 1957.

The transmission measuring apparatus shown in FIG. 1 measures the value of each desired transmission parameter at a plurality of test signal frequencies without the necessity of manually repositioning or disconnecting the transistor from its basic mounting network and additionally utilizes many of the same circuit components in each of the separate test path configurations and masks the actual component changes by the insertion of attenuation pads in the test path. The automatic repositioning of the transistor is additionally achieved without the necessity of having to change or adjust the bias supply.

A transistor 101, shown in block form in FIG. 1, is plugged into a mounting network 102 which includes the mounting terminals 103. The circuitry of the transmission measuring apparatus connected to the mounting network 102 is coaxial to minimize crosstalk at the high test signal frequencies. The mounting network 102 is preferably coaxial and designed to provide a smooth transition from the conductor geometry of the electrodes of the transistor 101 to the coaxial circuit geometry of the transmission measuring apparatus.

Shown adjacent to the transistor 101 and schematically connected to the mounting terminals 103 by dotted lines are certain calibration networks which are manually plugged into the mounting terminals 103 in place of the transistor 101 and used to measure certain calibration parameters. The calibration networks are coaxial in design and comprise an open circuit network 104, a short circuit network 105, a finite resistance termination 106, and a coaxial strap connector 107. The specific point or reference plane in the test path at which the calibration networks are inserted is identical to the point of insertion of the transistor connections to the test path so that the transmission measurements and the calibration measurements are related to a common reference plane. While the transmission measuring apparatus is described herein with respect to a coaxial transmission system, the principles of the invention are not limited to coaxial transmission facilities. A noncoaxial transmission measuring apparatus need not have the above-described well-defined reference planes of measurement.

The test signals applied to the transistor 101 are generated in the illustrative embodiment by a test signal source 110 which is adjustable to a plurality of test frequencies from 50 kHz. to 250 mHz. The test signal source 110 may comprise a frequency synthesizer comprising a plurality of crystal oscillators with frequency multiplication and harmonic filtering means to derive test signals with selected frequencies therefrom. It is to be understood that the test signal source 110 is not limited to the aforementioned frequency synthesizer but may comprise any signal source capable of precise controlled adjustment to a plurality of precise high frequency test signals.

Amplitude and phase changes induced in the generated test signal by traversing the transistor 101 and the various test paths of the transmission measuring apparatus are detected by a signal amplitude and phase detector 120. A reference path 115 interconnects the test signal source 110 and the amplitude and phase detector 120 to provide a reference with which the phase and amplitude changes induced in the test signal may be compared.

The particular frequencies of test signals generated by the test signal source 110 and the sequence of frequencies selected is controlled by a master test control 150. The master test control 150 may comprise a manual control or a special purpose logic control circuit similar in concept to the logic control circuit described in the patent application of G. D. Haynie et al., filed Oct. 30, 1963, Ser. No. 320,115, now Patent No. 3,355,662, assigned to applicants' assignee, or a specially programed general purpose computer control. The master test control 150 applies a sequence of test signal frequency control signals, via lead 151, to the test signal source 110 to control the selection of the various test signal frequencies. It also simultaneously applies a plurality of test sequence control signals, via the control gate 155, to the sequence control 160. The design of a master test control 150 to supply the needed control signals will be readily apparent to those skilled in the art and hence is not discussed herein in detail.

The sequence control 160 in response to the applied test sequence control signals, generated by the master test control 150, generates and applies signals to selected ones of the output leads 165 through 168 connected, via the OR gates 170, to the relay coils 181 through 189, respectively. The contacts of the particular coaxial relays energized by a selected output lead complete a particular test path configuration in which a particular transmission measurement of the transistor is made. The sequence control 160 further includes means responsive to the master test control 150 to apply control signals, via the output lead 163, to an impedance inversion control 161 and, via the output lead 164, to an alternate sampling switching control 162. The impedance inversion control 161, as described below, controls the insertion of a coaxial line 131 into the test path, which determines the shunt insertion transmission measurement, to transform the signal magnitude measured at the detector where desirable, into a more suitable magnitude range. The alternate sampling switching control 162, as described below, controls the rapid periodic alternative switching of an auxiliary coaxial path 109 and the mounting network 102 into the test path during the direct insertion transmission measurements. This rapid periodic alternative switching reduces errors in the transmission measurements due to drift variations of the test signal source 110 and shifts of the operating point of the amplitude and phase detector 120.

The alternate sampling technique and a description of relays suitable for the above application is described by T. Slonczewski in Electrical Engineering, vol. 73, April 1954, pp. 346–347. The relays described therein comprise a coaxially encapsulated mercury wetted relay with its characteristic impedance matched to that of the test path to minimize impedance discontinuities at the connections to the test path and including shielding to isolate the relay coil from the test path.

The relay coils 181 through 191 and their respective contacts 181M, 181B through 191M, 191B are disclosed schematically in FIG. 1 in a detached contact schematic representation. The relay contacts designated M are normally open and those designated B are normally closed with their corresponding relay coil unenergized. A single relay coil may control a plurality of M and B type contacts. A complete explanation of this manner of schematically representing relays is disclosed by F. T. Meyer in the AIEE Transactions, vol. 74, Part I, Communication and Electronics, pp. 505–513, September 1955.

The operation of the transmission measuring apparatus is described hereinbelow with reference to a specific sequence of test operations although it is to be understood that many alternative arrangements of this sequence may be devised by those skilled in the art without departing from the spirit and scope of the invention. The below-described test sequence measures the four respective shunt and direct insertion transmission parameters and the calibration parameters used to derive the normalized scattering matrix of the transistor 101. While the aforementioned tests are described hereinbelow with reference to the determination of the scattering matrix of the transistor 101, it is to be understood that the principles of the invention are equally applicable to the determination of other parameters.

The test sequence comprises a series of discrete testing operations at a plurality of frequencies involving the sequential connection of specific test path configurations including the mounting network 102 to the test signal source 110 and the amplitude and phase detector 120. The particular sequence utilized in describing the illustrative embodiment comprises the following steps:

(A) Initial calibration tests are conducted to measure the reflection coefficients and terminal impedances at the two mounting terminals 103 in each direction of signal transmission. The mounting network 102 is shunted in each direction across a circuit connection between the test signal source 10 and the amplitude and phase detector 120. Measurements are taken at each test signal frequency with the open circuit network 104, the short circuit network 105, the finite resistance termination 106, and the coaxial strap connector 107 sequentially inserted in the mounting terminals 103. The measurements with the open circuit network 104, the short circuit network 105, and the finite resistance termination 106 inserted in the mounting terminals 103 establish calibration parameters which are combined with the subsequently measured shunt insertion transmission parameter of the transistor 101 to establish its impedance scattering parameter referenced to the actual test path impedance. This scattering parameter may be derived from the reflection coefficient defined by the equation $$R_{aa} = \frac{(I_x - I_z)(I_\infty - I_o)}{(I_\infty - I_z)(I_x - I_o) + (I_z - I_o)(I_\infty - I_x)} \quad (1)$$

where:

$R_{aa}$ is the reflection coefficient defined with respect to the impedance of the finite resistance termination 106;

$I_x$ is the forward shunt insertion transmission measurement of the transistor 101 or terminal $b$ as seen through the coaxial strap connector 107;

$I_o$ is the forward shunt insertion calibration measurement of the short circuit network 105;

$I_\infty$ is the forward shunt insertion calibration measurement of the open circuit network 104; and $I_z$ is the forward shunt insertion calibration measurement of the finite resistance termination 106.

The derivation of this equation is in accord with the theoretical principles discussed in the aforementioned reference "Microwave Measurements" and hence is not discussed herein. The scattering parameter $S_{aa}$ is directly derived from the reflection coefficient $R_{aa}$.

The calibration measurement taken with the coaxial strap connector 107 inserted in the mounting terminals 103 is utilized to establish the actual test set terminal impedances. This measurement permits the actual scattering matrix to be mathematically normalized to a scattering matrix referenced to an idealized termination impedance. It is to be understood that if the physical nature of the mounting terminals 103 permits a direct connection, that the direct connection may be utilized in place of the coaxial strap connector 107 to conduct the measurements described herein with reference to the coaxial strap connector 107.

(B) Subsequent calibration tests with the coaxial strap connector 107 inserted in the mounting terminals 103 are conducted over the entire frequency range of test signals in both a forward and reverse direction of a test path connected so as to directly interpose the mounting network 102 in a circuit connection between the test signal source 110 and the amplitude and phase detector 120. The alternate sampling switch control 162 is activated during this test and causes rapid alternative periodic switching of the mounting network 102 and the auxiliary coaxial path 109 into the test path. The measurements of this calibration test permit the cancellation of the unknown factor induced into the subsequent direct insertion transmission measurements of the transistor 101 by the rapid periodic switching of the auxiliary coaxial path 109 into the test path. This unknown factor is eliminated by establishing a measurement ratio as defined in the following illustrative equation which permits the cancellation of measurement variations due to the auxiliary coaxial path 109:

$$\frac{I_{abx}/I_{abm}}{I_{abs}/I_{abm}} = \frac{I_{abx}}{I_{abs}} \qquad (2)$$

where:

$I_{abx}$ is the forward transfer transmission measurement of the transistor 101;
$I_{abs}$ is the forward transfer calibration measurement of the coaxial strap connector 107; and
$I_{abm}$ is the forward transfer transmission measurement of the auxiliary coaxial path 109.

(C) The transistor 101 is inserted in the mounting terminals 103, and, by the sequential switching of the mounting network 102 into the various test paths, its shunt and direct insertion transmission parameters are measured. These transmission parameters are converted into scattering parameters which in turn are normalized with reference to an idealized termination impedance. The theoretical principles of the normalization of a scattering matrix are discussed in the aforementioned reference "Network Theory" and hence is not discussed herein.

The aforementioned test sequence is initiated by manually activating the master test control 150, via the manual control 153. The manual control 153 may comprise the control console of a general purpose computer specially programed to supply the test sequence signals. The master test control 150 applies a coded array of test sequence control signals, via the control gate 155, to the sequence control 160, which in response thereto energizes its output lead 165. The relay coils 181, 182, 183, and 188, connected, via the OR gates 170, to the output lead 165 are consequently energized. The energized relay coil 181 closes its normally open contacts 181M and opens its normally closed contacts 181B. These switched contacts complete a direct transmission path from the test signal source 110 to the amplitude and phase detector 120. The energized relays 182, 183, and 188, respectively, close the normally open relay contacts 182M, 183M, and 188M which make the connections to shunt the transistor mounting network 102 in a forward direction across the aforementioned direct transmission path. The shunt connection is terminated in a bridging termination impedance 121 which has an impedance value substantially equal to the test path characteristic impedance and to the output and input impedance of the test signal source 110 and the amplitude and phase detector 120, respectively. This test path designated Z11 is indicated in FIG. 1 by the direction indicating arrowheads adjacent to the coaxial conductors included in the test path Z11. The direct transmission connection of the portion of the test path Z11 between the signal source 110 and the detector 120 includes the attenuation pads 141 and 142 and the resistors 143 and 144 symmetrically arranged about the connection to the shunt path to maintain an approximately constant impedance level as viewed from the shunt path.

The aforementioned calibration networks 104, 105, 106, and 107 are each inserted in sequence into the mounting terminals 103. With the calibration networks 104, 105, and 106 sequentially inserted, a shunt insertion calibration parameter is measured at each test signal frequency. Additional test measurements are made at each test signal frequency with the coaxial strap connector 107 inserted in the mounting terminals 103. The resultant signal measurements made by the detector 120 are read out in a data readout set 129. The measurements to be read out are applied first to the master test control 150, via the lead 128. If the measurement magnitude is in a range unsuitable for the detector 120, the master test control 150 directs the sequence control 160 to actuate the impedance inversion control 161 which by energizing the relay coil 191 inserts a fixed length transmission line 131 into the test path to adjust the test signal amplitude into another magnitude range which may be better suited to the operating range of the detector 120. With properly selected test frequencies, the line 131 is a quarter wavelength transmission line and hence inverts the magnitude of the test signal. The test signal frequencies and the line length are preferably selected to exploit the signal magnitude inversion properties of a quarter wavelength line.

The master test control 150 is programed to regulate the test signal source 110 to generate the desired frequency sequence of test signals to test each of the calibration networks 104, 105, 106, and 107 and at the end of each sequence to halt the test signal source to permit the insertion of a subsequent calibration network. Upon the insertion of a subsequent calibration network, a signal is applied to the master test control 150 via the manual control 153, to cause it to activate the test signal source 110 to again generate a complete frequency sequence of test signals. While the above test sequence is described with reference to manual control, those skilled in the art may readily devise automatic control systems without departing from the spirit and scope of the invention. The manual control 153, in addition, may be used to generate test sequence control signals to the exclusion of the master test control 150 if so desired. These manual test sequence control signals are applied to the control gate 155 and from thence to the sequence control 160.

The measurements taken with the calibration networks 104, 105, and 106 inserted in the mounting network 102 are used in combination with the subsequent shunt insertion transmission measurements of the transistor 101 to derive the impedance scattering parameter of the transistor 101 as described above with reference to Equation 1. The shunt insertion measurements taken with the coaxial strap connector 107 interconnecting the mounting terminals 103 represent the actual mounting terminal impedances of the test apparatus. These impedances are utilized to subsequently normalize the derived scattering matrix to an idealized impedance.

The attenuation pad 125 is included in the test path Z11 to minimize changes in the test signal reflections at the mounting terminals 103, when switching from one test path configuration to another configuration. The attenuation pad 125, by thus minimizing the changes in the signal reflections, effectively terminates the transistor 101 in substantially the same terminating impedance in all of the test path configurations. This terminating impedance consistency also permits a more accurate determination of this terminating impedance. Hence this terminating impedance value accurately represents the impedance to which the actual scattering matrix is referenced and is therefore the impedance value used to normalize the scattering matrix to reference it to the idealized impedance.

Upon the completion of the aforementioned calibration measurements, the master test control 150 directs the sequence control 160 to energize its output lead 166. The energized lead 166 activates the relay coils 181, 187, and 189 which in turn open the normally closed relay contacts 181B, 187B, and 189B and close the normally open relay contacts 181M, 187M, and 189M. These activated contacts complete the test path Z22, as indicated by the arrows shown in FIG. 1, and terminates this test path with the bridging termination impedance 121. The calibration networks 104, 105, 106, and 107 are sequentially inserted in the mounting terminals 103 and the reverse direction calibration measurements are taken in the same manner as was described above with reference to the test path Z11. The test path Z22 includes the attenuation pad 126 which is inserted in the same fashion as described above for the attenuation pad 125 with reference to the test path Z11.

The sequence control 160, in response to the master test control 150, subsequently energizes its output lead 167 activating the relay coils 183, 184, and 185 to complete the test path Z12, as indicated in FIG. 1. The coaxial strap connector 107 is inserted in the mounting terminals 103 and forward direct insertion calibration measurements are made for each test signal frequency. The output lead 168 is subsequently energized, in response to the master test control 150, thereby completing the oppositely directed test path Z21 as shown in FIG. 1. Direct insertion calibration measurements are taken in this reverse direction at each test signal frequency.

The sequence control 160, during the preceding forward and reverse direct insertion calibration measurements energizes its output lead 164 to activate the alternate sampling switching control 162 which periodically energizes the relay coil 190 in such a manner so as to cause rapid switching to periodically alternatively insert the auxiliary coaxial path 109 and the mounting network 102 into the test path at each test signal frequency. This periodic alternative switching reduces the adverse effects of level drifts of the test signal source 110 and the amplitude and phase detector 120 on the signal measurements taken. These direct insertion calibration measurements with the coaxial strap connector 107 are utilized, as described hereinabove, with reference to Equation 2, to eliminate the unknown factors introduced into the direct insertion transmission measurements of the transistor 101 by the alternative sampling switching technique.

Upon the completion of the aforementioned preliminary calibration measurements, the master test control 150 halts the test sequence to permit the insertion of the transistor 101 into the mounting terminals 103. The two adjustable bias supplies 100, described in detail hereinbelow with reference to FIG. 2, are adjusted to supply the desired bias signals to the transistor 101 and the master test control 150 is directed, via the manual control 153, to resume the testing procedure.

The sequence control 160, in response to the master test control 150, energizes its output lead 165. The test path Z11, including the attenuation pad 125, is enabled in the same manner as is described above for the shunt insertion calibration measurements. The test signal source 110, in response to the master test control 150, generates a full sequence of test signals at a preselected plurality of frequencies. These test signals are applied to the mounted transistor 101, via test path Z11, to make the shunt insertion transmission measurements from which its forward direction impedance scattering parameters may be derived.

The same sequence of test signals is applied in response to the master test control 150, to the subsequently connected test path Z22, to measure the reverse shunt insertion transmission parameters, from which the reverse direction impedance scattering parameters are derived.

Upon completion of the aforementioned measurements to determine the shunt insertion transmission parameters, the sequence control 160, in response to the master test control 150, energizes its output lead 167, thereby completing the test path Z12. The test path Z12 is arranged to measure the forward direction direct insertion transmission parameters of the transistor 101. The sequence control 160 during the application of test signals to test path Z12, as described above with reference to the direct insertion calibration measurements, applies a signal to the alternate sampling switching control 162 which in turn activates the relay 190 in such a fashion so as to cause a periodic rapid alternative switching of the auxiliary coaxial path 109 and the transistor mounting network 102 into the test path Z12 at each test signal frequency. The test path Z12 includes the attenuation pads 125 and 126 which effectively isolate the mounting network 102 and the auxiliary coaxial path 109 from impedance imperfections in the balance of the test path Z12.

The test path Z21 is subsequently enabled by the sequence control 160, in response to the master test control 150, to measure the reverse direct insertion transmission parameters of the transistor 101. The full range of test signals is applied to the test path Z21, and the alternate sampling switching control 162 is activated in the same manner, as described above with reference to measurements made in the test path Z12.

It will be apparent to those skilled in the art that the test paths Z12 and Z21 each include within the test path positioned substantially adjacent to the mounting network 102 the attenuation pads 125 and 126 which minimize the effect of the frequency responsive impedance imperfections of the aforementioned test paths Z12 and Z21 on the transistor 101. The shunt test paths, comprising test paths Z11 and Z22, each include only one attenuation pad, either 125 or 126, which is inserted between the transistor mounting network 102 and the bridging termination impedance 121; the other attenuation pad 126 or 125 is switched out of the shunt test path entirely. The removal of the second attenuation pad improves the resolution of the shunt insertion transmission measurement while the inserted attenuation pad minimizes the change in test signal measurements due to frequency responses and imperfections of the remaining portion of the test path. This minimization of frequency responsive impedance change, coupled with the utilization of substantially the same coaxial transmission components in the various test paths, readily permits the measurement of the mounting terminal input impedance of this remaining portion of the test path which measurement is used to normalize the scattering matrix of the transistor 101. From the foregoing it is apparent that the attenuation pads maintain the transistor terminations at a substantially constant impedance level permitting accurate parameter measurements over the entire frequency range.

FIG. 2 shows in detail the bias signal application network which is included in the adjustable bias supply designated 100 in FIG. 1. The bias circuitry disclosed in FIG. 2 comprises a coaxially encapsulated bias signal application network 206 utilized to transmit bias signals from the bias signal sources 205 or 215 to the mounting terminal 103 which is connected to one of the electrodes of the transistor 101. A coupling capacitor 230 included in the test path connection isolates the bias signals from the test path. The bias signal source comprises the adjustable voltage source 205 and the adjustable current source 215 each of which may be individually connected to the bias signal application network 206. An ammeter 225 and a voltmeter 226 are included as shown in FIG. 2 to facilitate the current and voltage adjustments.

The bias signal application network 206 comprises a plurality of signal transmission stages including passive circuit elements comprising resistors, inductors, and capacitors. The signal characteristics of this bias signal application network 206 includes a very high constant AC impedance to high frequency AC signals over a broad frequency range and a very low DC impedance. The magnitudes of impedance of the components comprising each stage, with the exception of the resistors 201, 202, and 203, differ in value by at least an order of magnitude from the components of adjacent stages. The inductance of the inductor 221, for instance, exceeds the inductance of the inductor 222 by an order of magnitude which in turn exceeds the inductance of the inductor 223 by an order of magnitude and so on. Similarly, the capacitances of the capacitors 211, 212, and 213 are related in the same manner as described for the inductors. The series connected resistors 201, 202, and 203 are of equal impedance and hence limit the maximum AC impedance of each stage.

A continuous inductance path comprising the inductors 221, 222, 223, and 224 traverses all the stages, interconnecting each previous stage to a subsequent stage. Hence a continuous path of negligible DC impedance interconnects the bias signal source 205 or 215 to the mounting terminals 103. The negligible DC impedance permits the ready adjustment of voltage and current bias signals applied respectively to the two mounting terminals 103 without the necessity for approximation adjustments to compensate for the amplification effects of the transistor on one bias signal in response to an adjustment of the other bias signal.

The bias signal application network 206 is coaxially encapsulated and matched to the coaxial test path. The encapsulation includes the feed-through capacitors 231 which assist in isolating the bias signal from the test path itself.

The nature of the operation of the bias signal application network 206 may readily be described by describing the impedance response of its successive stages as the test signals increase in frequency. At the low frequency test signals, the capacitor 211 presents a high impedance to the test signal. The inductor 221 also presents a high impedance to the test signal. As the frequency of the test signal increases, the parallel connected capacitor 211 and inductor 221 eventually become resonant. The maximum impedance presented to the test signal at this resonant point is limited, however, by the resistor 201. Subsequent to this resonant frequency, the parallel impedance of the capacitor 211 and the inductor 221 decreases. The inductor 221 is specifically selected with parasitic impedance characteristics so that as the test signal frequency continues to increase, it appears to the test signal as a capacitance rather than as an inductance. At this stage in the frequency of the test signal, the combined capacitance effect of the capacitor 211 and the inductor 221 lowers the impedance of the first stage to a very small value. Nevertheless, as the frequency of the test signal increases, the parallel impedance of the capacitor 212 and the inductor 222 of the second stage has been increasing and hence compensating for the declining impedance of the first stage. As the test signal frequency continues to increase, the parallel connected capacitor 212 and inductor 222 eventually become resonant and subsequent to that point in frequency their combined capacitance lowers the impedance of the second stage to a low value. As the impedance of the second stage decreases, the impedance of the third stage increases in the aforedescribed manner. The fourth and last stage comprises a single inductor 224 which presents a high impedance to the test signals at the upper end of the frequency range of the test signals.

It will be apparent to those skilled in the art that the various stages of the bias signal application network 206 constitute a plurality of signal application networks whose frequency responsive impedance characteristics are interleaved in frequency and hence with the increase in the test signal frequency, a substantially constant impedance is presented to the test signal over the entire range of test signal frequencies.

What is claimed is:

1. In combination a test signal source, a signal detector, mounting network means including mounting terminals to accept electrical devices for test purposes, test signal transmission means interconnecting said signal source and said signal detector, a plurality of signal attenuation means, first means arranged for connecting said mounting network means in said test signal transmission means so as to directly interpose said mounting network means between said signal source and said signal detector, said first connecting means further including means to insert at least one of said signal attenuation means substantially adjacent to each connection of said mounting network means to said test signal transmission means, second means arranged for connecting said mounting network means in said test signal transmission means in a bridging connection so as to shunt said mounting network means across a direct signal connection between said signal source and said signal detector and including means to terminate said bridging connection in a fixed termination impedance, said second connecting means further including means to insert at least one of said signal attenuation means substantially adjacent to a connection of said mounting network means to said test signal transmission means and between said mounting network means and said fixed termination impedance, and signal application means for applying bias signals to said mounting terminals and including means to maintain said signal application means at a high and substantially constant impedance over a wide frequency range.

2. The combination described in claim 1 wherein said means to maintain said signal application means at a high and substantially constant impedance over a wide frequency range includes a plurality of signal transmission stages, each of said stages comprising a plurality of frequency responsive signal transmission components in parallel with a frequency invariant signal transmission component, said frequency invariant components of said plurality of stages being of equal magnitude and said frequency responsive components of said plurality of stages being related in frequency responsiveness so that a frequency responsive impedance increase of the combined said plurality of frequency responsive components in one of said stages is counteracted by a frequency responsive impedance decrease of the combined said plurality of frequency responsive components in at least another one of said stages and low impedance bias signal transmission means included in each of said stages.

3. The combination described in claim 2 wherein said test signal transmission means comprises a plurality of test signal transmission components and said first and second means arranged for connecting comprises switching means to selectively arrange a plurality of predetermined test path configurations from selected combinations of said plurality of test signal transmission components, each of said plurality of predetermined test path configurations utilizing substantially the same plurality of test signal transmission components to minimize characteristic impedance variations between said plurality of test path configurations.

4. The combination described in claim 3 further including means to measure the characteristic impedance of said test signal transmission components as terminated in said fixed termination impedance in said bridging connection, said means to measure including coaxial strap connection means with a well-defined electrical length to interconnect said mounting terminals.

5. The combination described in claim 4 wherein said low impedance bias signal transmission means comprises series connected inductive transmission components traversing each of said stages.

6. In combination in a transistor parameter measuring system, test signal source means to sequentially generate a preselected plurality of test signals at different selected frequencies, signal detection means to measure the test signal amplitude and phase, transistor mounting means comprising mounting terminals to accept a transistor and including external connection means connected to at least two of said mounting terminals, a transistor positioned in said mounting terminals, a plurality of signal attenuation means, first test path means connected to said external connection means and arranged to interpose said transistor mounting means in a first predetermined transmission network between said signal source means and said signal detection means, said plurality of signal attenuation means included and positioned in said first test path means to substantially isolate said transistor mounting means for signal disturbances in said first test path means, second test path means arranged to shunt said transistor mounting means across a second predetermined transmission network interconnecting said signal source means and said signal detection means, one of said external connection means coupled to said second predetermined network and termination impedance means coupled to another one of said external connection means, means to insert at least one of said signal attenuation means between said another one of said external connection means and said coupled termination impedance means, and bias signal source means connected to said mounting terminals, said bias signal source means including means for uniformly precluding the attenuation of said plurality of test signals.

7. A transistor parameter measuring system as defined in claim 6 wherein said means for uniformly precluding the attenuation of said plurality of test signals comprises a multistage network comprising a plurality of signal conductive stages including frequency responsive impedance members, said frequency responsive impedance members selected to permit each of said stages to exhibit a high impedance characteristic in a different frequency range, and to permit the frequency responsive increasing impedance of one stage to compensate for the frequency responsive declining impedance of a previous contiguous stage and further including a bias signal path of very low impedance in each stage.

8. A transistor parameter measuring system as defined in claim 7 further including switching means arranged to selectively construct said first and second test path means, said switching means including means to utilize substantially the same signal transmission members for each of said first and second test paths.

9. A method of determining the scattering matrix of a transistor normalized to some idealized impedance comprising the steps of generating a plurality of test signals at preselected frequencies, constructing a first test path including a direct connection between input and output terminals and bridging a shunt path across said direct connection, including means in said shunt path to accept transistors, terminating said shunt path in an impedance, said terminating impedance being substatially equal to the characteristic impedances of transmission components of said first test path and said shunt path, inserting signal attenuation means in said shunt path adjacent to said means to accept and between said means to accept and said terminating impedance, inserting in succession in said means to accept an open circuit network, a short circuit network, a finite impedance network, and a transistor, applying said plurality of test signals to said input terminal of said first test path, and measuring the effect of each of said successive insertions on its amplitude and phase at the said output terminal of said first test path to determine the forward impedance scattering parameter of said transistor, inserting an impedance defined coaxial strap connector in said means to accept, applying said plurality of test signals to said input terminal and measuring its amplitude and phase at the said output terminal to determine the terminal impedances of said means to accept transistors, reversing said shunt path connection to said direct connection and said terminating impedance, performing the aforementioned insertion and signal application steps to measure the reverse impedance scattering parameter of said transistor and the oppositely directed terminal impedances of said means to accept transistors, constructing a second test path directly connecting said input and output terminals and including in series many of the transmission components previously comprising said first test path and said means to accept transistors, inserting signal attenuation means in said second test path adjacent to the connections of said means to accept to said second test path, inserting said transistor in said means to accept, applying said plurality of test signals to said input terminal of said second test path and measuring its amplitude and phase at said output terminal of said second test path to determine the forward transfer scattering parameter of said transistor, and applying said plurality of test signals to said output terminal of said second test path and measuring its amplitude and phase at said input terminal of said second test path to determine the reverse transfer scattering parameter of said transistor.

10. The method of determining the scattering matrix of a transistor normalized to some idealized impedance as defined in claim 9 wherein said steps to determine the forward and reverse transfer scattering parameter of said transistor further include the steps of inserting in said second test path an auxiliary path in parallel with said means to accept, periodically alternatively enabling transmission of said applied test signals to said second test path through said means to accept including said inserted transistor and said auxiliary path, inserting said coaxial strap connector in said means to accept in said second test path with said auxiliary path in parallel with said coaxial strap connector, periodically alternatively enabling transmission of said test signals applied to said second test path through said means to accept including said coaxial strap connector and said auxiliary path, and utilizing the signal measurements with said coaxial strap connector inserted to eliminate the effect of said auxiliary path on the said signal measurements taken with said transistor inserted.

11. A method of determining the transmission parameters of a transistor comprising the steps of mounting said transistor in a transistor mounting device having two external connecting terminals and applying bias signals to said transistor, interconnecting a source of multifrequency test signals and signal detecting apparatus with test signal transmission apparatus comprising a plurality of signal tarnsmission components including two signal attenuators, arranging said signal transmission components and said transistor mounting device into a first test path configuration so as to directly interpose said transistor mounting device between said source of multifrequency test signals and said signal detecting apparatus, inserting said two signal attenuators in said first test path configuration, respectively, substantially adjacent to the said two connecting terminals of said transistor mounting device, applying test signals with said source of multifrequency test signals to one end of said first test path and measuring the said test signal with said signal detecting apparatus at the other end of said first test path, reversing the connections of said first test path to said source of multifrequency test signals and said signal detecting apparatus, applying test signals with said source of multifrequency test signals to the said other end of said first test path and measuring the said test signal with said signal detecting apparatus at the said one end of said first test path, arranging said signal transmission components and said transistor mounting device into a second test path configuration so as to shunt said transistor mounting device in a bridging connection across a direct signal connection between said source of multifrequency test signals and said signal detecting apparatus, terminating said bridging connection in an impedance substantially equal to the characteristic impedance of said transmission components, inserting one of said signal attenuators in said second test path substantially adjacent to one of said connecting terminals and between said one of said connecting terminals and said impedance terminating said bridging connection, applying test signals with said source of multifrequency test signals to the one end of said second test path and apparatus at the other end of said second test path, reversing the connection of said bridging connections to measuring the said test signal with said signal detecting said second test path and said terminating impedance, inserting one of said signal attenuators in said second test path substantially adjacent to the other one of said connecting terminals and between said other one of said connecting terminals and said impedance terminating said bridging connection with the reversed connections, and applying test signals with said source of multifrequency test signals to said one end of said second test path and measuring the said test signal with said signal detecting apparatus at the said other end of said second test path.

12. A method of determining the transmission parameters of a transistor as described in claim 11 further comprising the steps of inserting a coaxial strap connector with well-defined transmission characteristics into said transistor mounting device, as connected to said second test path, applying test signals with said source of multifrequency test signals to one end of said second test path and measuring the said test signal with said signal detecting apparatus at the other end of said second test path, reversing the connection of said bridging connection to said second test path and said terminating impedance, applying test signals with said source of multifrequency test signals to the said one end of said second test path and measuring said test signal with said signal detecting apparatus at the said other end of said second test path and utilizing said measured test signal values to determine the transmission characteristics of the said transmission components.

13. A method of determining the transmission parameters of a transistor as described in claim 12 wherein said application of bias signals comprises the steps of connecting a bias signal source to said transistor mounting device and isolating the bias signal source from said multifrequency test signals by inserting a frequency invariant high impedance signal connection in the signal transmission path connecting said bias signal source to said transistor mounting device.

References Cited

Hewlett Packard Application Note 77–1, "Transistor Parameter Measurements," January 1967, pages 1–12.

RUDOLPH V. ROLINEC, Primary Examiner

E. L. STOLARUN, Assistant Examiner

U.S. Cl. X.R.

324—57